United States Patent [19]
White, Jr. et al.

[11] Patent Number: 5,645,295
[45] Date of Patent: Jul. 8, 1997

[54] SEAT MOUNTED AIR BAG MODULE

[75] Inventors: Michael J. White, Jr., Shelby Township; Richard E. Shellabarger, Sterling Heights, both of Mich.

[73] Assignee: TRW Vehicle Safety Systems Inc., Lyndhurst, Ohio

[21] Appl. No.: 626,480

[22] Filed: Apr. 2, 1996

[51] Int. Cl.⁶ .................................................. B60R 21/22
[52] U.S. Cl. ........................ 280/730.2; 280/728.3
[58] Field of Search ......................... 280/728.1, 728.2, 280/728.3, 732, 743.1, 741, 730.2, 730.1

[56] References Cited

U.S. PATENT DOCUMENTS

| | | | |
|---|---|---|---|
| 3,630,472 | 12/1971 | Axenborg | 244/122 |
| 5,062,664 | 11/1991 | Bishop et al. | 280/732 |
| 5,348,342 | 9/1994 | Haland et al. | 280/730.2 |
| 5,553,887 | 9/1996 | Karlow et al. | 280/728.3 |

FOREIGN PATENT DOCUMENTS 2281259  1/1995  United Kingdom ............... 280/728.1

*Primary Examiner*—Paul N. Dickson
*Attorney, Agent, or Firm*—Tarolli, Sundheim, Covell, Tummino & Szabo

[57] ABSTRACT

An air bag module (10) includes an air bag (30), an inflator assembly (32), and a cover (40). The cover (40) includes first and second cover parts (42, 44) which are releasably interconnected by a rupturable portion (46) of the cover. The cover (40) has a closed condition in which the first and second cover parts (42, 44) enclose the air bag (30) when the air bag is in a deflated condition. The rupturable portion (46) of the cover (40) forms a first hinge about which the cover parts (42, 44) are pivotable relative to each other into the closed position. When the air bag (30) inflates, the rupturable portion (46) of the cover (40) is ruptured and the first and second cover parts (42, 44) move apart from each other to enable the air bag to inflate out of the cover.

19 Claims, 5 Drawing Sheets

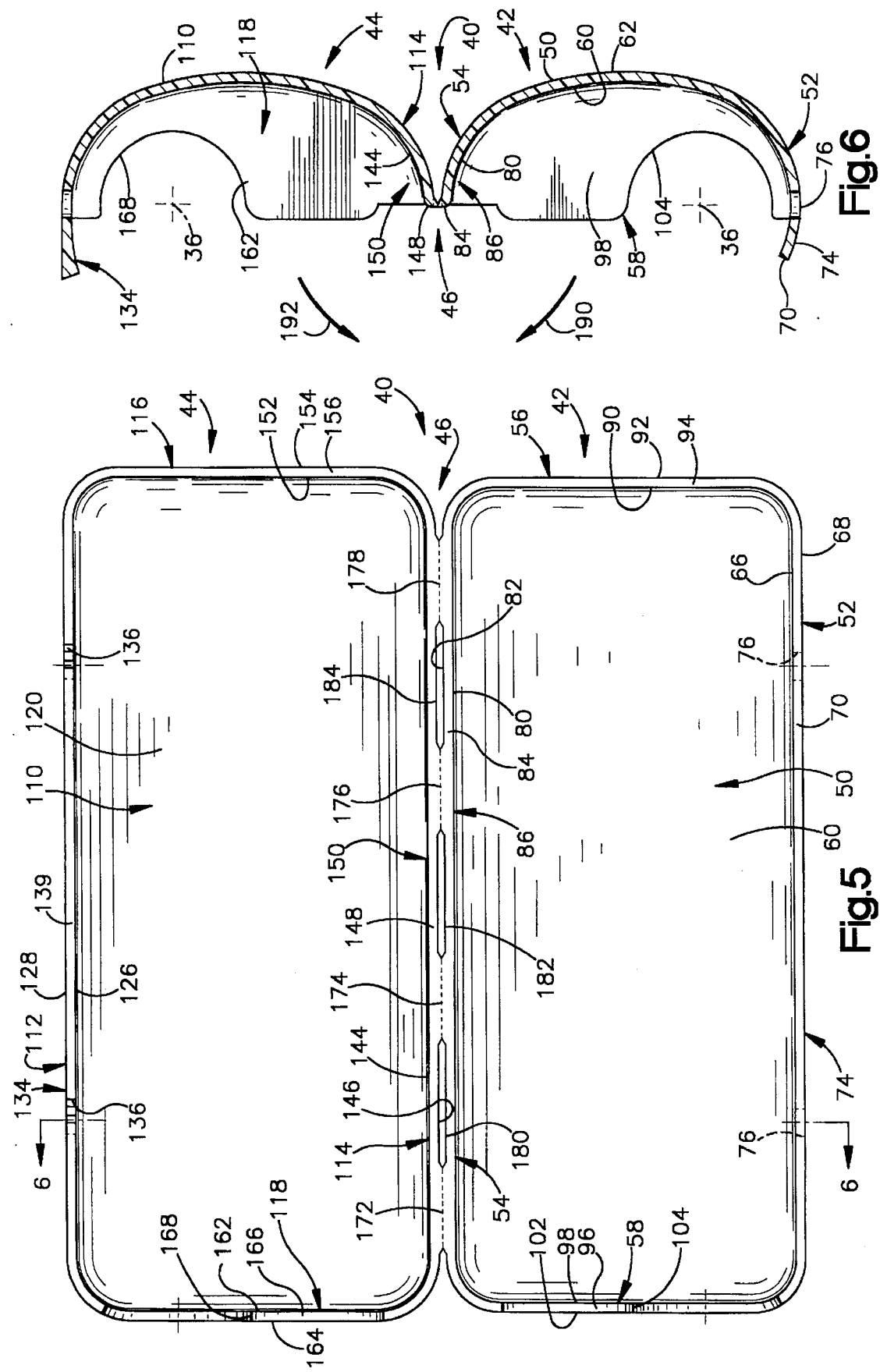

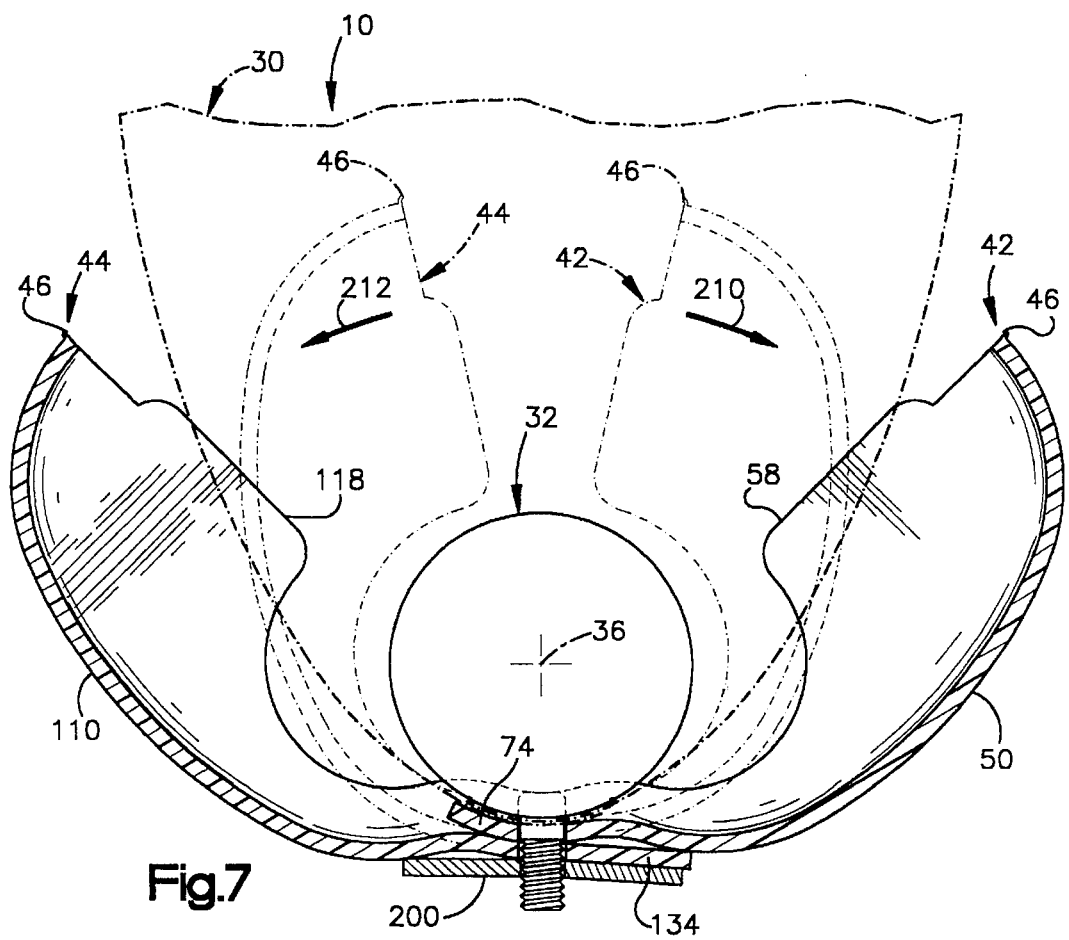
Fig.7
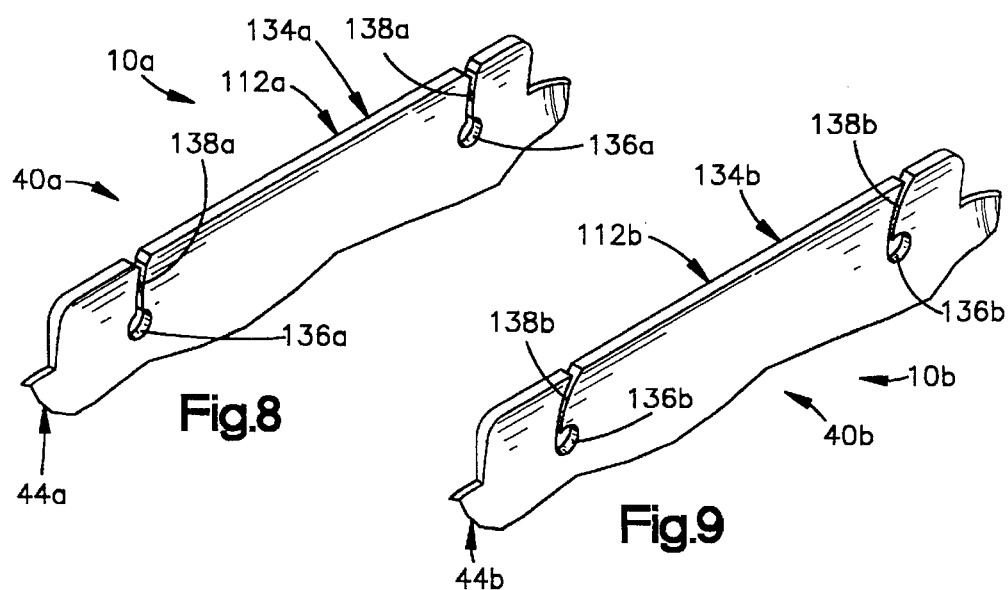
Fig.8
Fig.9

SEAT MOUNTED AIR BAG MODULE

BACKGROUND OF THE INVENTION

1. Technical Field

The present invention relates to a vehicle safety apparatus and, in particular, relates to an air bag module which is mounted in a vehicle seat and which includes an inflatable vehicle occupant protection device, such as an air bag, for helping to protect a vehicle occupant in the event of a side impact to the vehicle.

2. Description of the Prior Art

It is known to inflate an air bag to help protect a vehicle occupant in the event of an impact to a vehicle of a magnitude above a predetermined threshold. The air bag is stored in a deflated condition, together with an inflator, in a portion of the vehicle such as a vehicle seat. The vehicle seat is disposed adjacent to side structure of the vehicle, such as a door, window, or body panel of the vehicle. In the event of an impact, such as a side impact, to the vehicle of a magnitude above the predetermined threshold, the inflator is actuated, and the air bag is inflated into a position between the vehicle occupant in the vehicle seat and the adjacent side structure of the vehicle. The air bag helps protect the vehicle occupant from forcefully being struck by parts of the side structure of the vehicle. The air bag can also help protect the vehicle occupant from objects which might intrude into the vehicle, such as a pole or a tree, during the side impact.

SUMMARY OF THE INVENTION

The present invention is a vehicle safety apparatus for helping to protect an occupant of a vehicle seat in the event of an impact to the vehicle. The apparatus comprises an inflatable occupant protection device having a deflated condition and being inflatable into a position adjacent to the vehicle occupant. An inflator is actuatable to provide inflation fluid for inflating the inflatable device from the deflated condition to an inflated condition. The vehicle safety apparatus includes a cover including first and second cover parts which are releasably interconnected by a rupturable portion of the cover. The cover has a closed condition in which the first and second cover parts enclose the inflatable device when the inflatable device is in the deflated condition. The rupturable portion of the cover comprises a first hinge about which the cover parts are pivotable relative to each other into the closed position to enclose the inflatable device. The cover is movable, due to the force of inflation of the inflatable device, from the closed condition to an open condition in which the rupturable portion of the cover is ruptured and the first and second cover parts are spaced apart from each other to enable movement of the inflatable device out of the cover.

In a preferred embodiment, the vehicle safety apparatus includes means for mounting the inflatable device and the inflator and the cover within the vehicle seat.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 5 is a plan view of the cover of FIG. 4;

FIG. 6 is a sectional view taken along line 6—6 of FIG. 5;

FIG. 7 is view similar to FIG. 2 showing the air bag in an inflated condition and the cover in an open condition; and FIG. 8 is a fragmentary view of a cover which is constructed in accordance with a second embodiment of the present invention; and FIG. 9 is a fragmentary view of a cover which is constructed in accordance with a third embodiment of the present invention.

DESCRIPTION OF PREFERRED EMBODIMENTS

Figure 1:
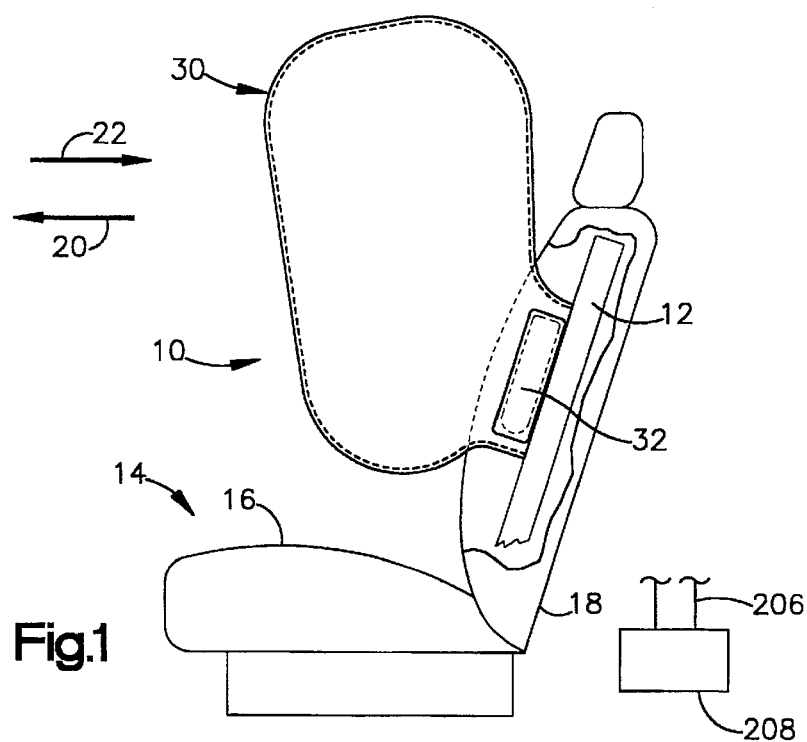
FIG. 1 is a schematic side elevational view of a vehicle seat and an air bag module constructed in accordance with the present invention, showing the air bag in an inflated/ condition.

The present invention relates to a vehicle safety apparatus and, in particular, relates to an air bag module including an inflatable vehicle occupant protection device, such as an air bag, for helping to protect a vehicle occupant in the event of a side impact to the vehicle. The present invention is applicable to various vehicle safety apparatus constructions. As representative of the present invention, FIG. 1 illustrates a vehicle safety apparatus or air bag module 10.

The air bag module 10 is connected with a seat frame member 12 of a seat 14 for an occupant of a vehicle. The seat 14 includes a seat bottom cushion 16 and a seatback 18 connected with the seat bottom cushion. A forward direction in the vehicle is indicated by the arrow 20 (FIG. 1) and a rearward direction in the vehicle is indicated by the arrow 22.

The air bag module 10 includes a particular type of inflatable device, illustrated schematically at 30, which is commonly known as an air bag. The air bag 30 is described below in detail. The air bag module 10 also includes an inflator assembly indicated schematically at 32 which includes an inflator in a diffuser. The inflator 32 preferably contains a stored quantity of pressurized inflation fluid and an ignitable material for heating the inflation fluid. The module 10 alternatively could include an inflator which uses the combustion of gas-generating material to generate inflation fluid in the form of gas to inflate the air bag 30, or an inflator which contains only a stored quantity of pressurized inflation fluid for inflating the air bag.

A series of fluid outlets 34 (FIG. 3) are formed in the inflator assembly 32 for directing inflation fluid to flow from the inflator assembly into the air bag 30. The fluid outlets 34 are arranged in a straight line which extends parallel to an axis 36 of the module 10. A plurality of mounting bolts 38 extend radially outward from the inflator assembly 32 opposite the outlets 34. Preferably, the mounting bolts 38 extend from the diffuser of the inflator assembly 32, and the diffuser includes the fluid outlets 34 for directing inflation fluid to flow from the inflator into the air bag 30.

The air bag 30 is preferably made from a fabric material, such as woven nylon. The air bag 30 can alternatively be made from a non-woven material, such as plastic film. The use of plastic film, in particular, would require one or more inflation fluid vents to be formed in the air bag 30, as is known in the art.

The air bag module 10 includes a cover 40 (FIGS. 2–6) for enclosing the air bag 30 and the inflator assembly 32. The cover 40 is made from a material which is strong enough to protect the parts of the air bag module 10 which are enclosed within the cover. The material of the cover 40 is, preferably, soft enough, that is, sufficiently flexible or deformable, that the cover is not perceived by an occupant of the seat 14 as being a hard or rigid object in the seatback 18. A preferred material for the cover 40 is DuPont Hytrel DYM 100 thermoplastic polyester elastomer, having a material thickness of about 2 mm. This preferred material is available from E. I. DuPont de Nemours & Co. of Wilmington, Del.

The cover 40 has a clam-shell configuration including a first part 42 and a second part 44 which are generally similar in configuration. The two cover parts 42 and 44 are interconnected by a rupturable portion 46 of the cover 40. The rupturable portion 46 of the cover 40 serves as a hinge or flexible joint which enables relative pivotal movement between the two cover parts 42 and 44.

Figure 2:
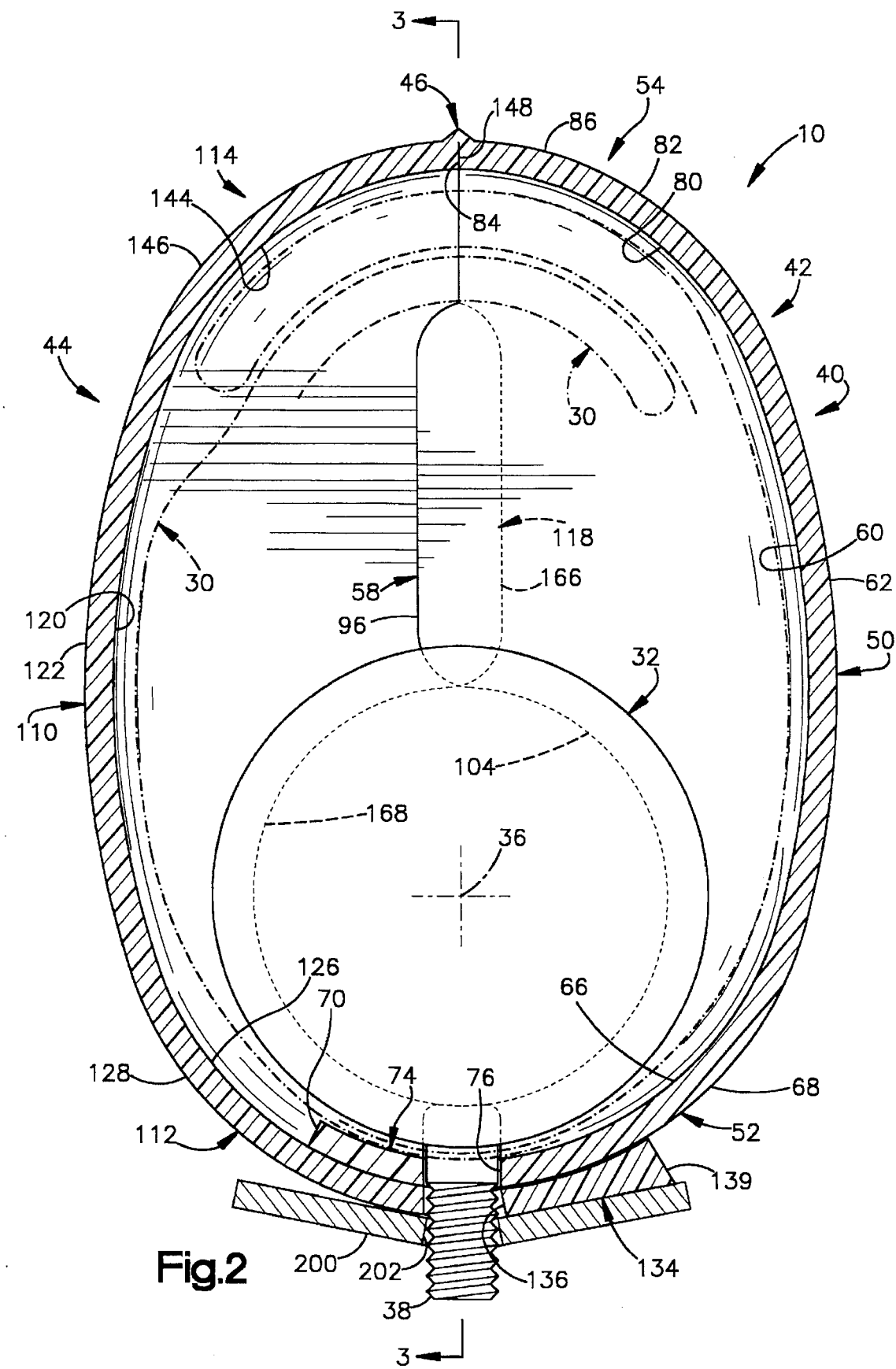
FIG. 2 is a transverse sectional view through the air bag module of FIG. 1, including a cover which forms a part of the air bag module and which is shown in a closed condition.

The first part 42 of the cover 40 includes an arcuate main wall 50 and first and second opposite end walls 56 and 58. The main wall 50 extends between and interconnects the end walls 56 and 58. The main wall 50 of the first cover part 42 has opposite inner and outer side surfaces 60 and 62 (FIG. 2).

An inner edge portion 52 of the main wall 50 of the first cover part 42 extends parallel to the axis 36 and has opposite inner and outer side surfaces 66 and 68. The inner edge portion 52 includes a flange portion 74 of the first cover part 42. A pair of circular fastening openings 76 are formed in the flange portion 74. The fastener openings 76 are spaced apart from each other and are located near to the axial ends of the flange portion 74. The flange portion 74 includes an edge surface 70 of the first cover part 42 which extends between the inner and outer side surfaces 66 and 68.

An outer edge portion 54 of the first cover part 42 extends parallel to the axis 36 at a location spaced apart from the inner edge portion 52. The outer edge portion 54 has opposite inner and outer side surfaces 80 and 82 between which extends an edge surface 84. The outer edge portion 54 of the first cover part 42 is adjacent to and connected with the rupturable portion 46 of the cover 40, as described below.

The first end wall 56 (FIGS. 4 and 5) of the first cover part 42 has a generally planar configuration and extends perpendicular to the axis 36. The first end wall 56 has opposite inner and outer side surfaces 90 and 92 and an edge surface 94 that extends between the inner and outer side surfaces.

The second end wall 58 of the first cover part 42 extends parallel to the first end wall 56 at the opposite axial end of the first cover part. The second end wall 58 has a generally planar configuration and extends perpendicular to the axis 36. An edge surface 96 of the second end wall 58 extends between opposite inner and outer side surfaces 98 (FIG. 5) and 102. A generally semi-circular opening 104 is formed in the second end wall 58. The opening 104 is sized to enable access to the inflator assembly 32 when the air bag module 10 is in the assembled condition. The opening 104 is centered on the axis 36 when the air bag module 10 is in the assembled condition shown in FIG. 2.

The second part 44 of the cover 40 includes an arcuate main wall 110 and opposite first and second end walls 116 and 118. The main wall 110 extends between and interconnects the end walls 116 and 118. The main wall 110 has opposite inner and outer side surfaces 120 and 122.

An inner edge portion 112 of the main wall 110 of the second cover part 44 extends parallel to the axis 36 and has opposite inner and outer side surfaces 126 and 128. The inner edge portion 112 includes a flange portion 134 of the second part 44 of the cover 40. The flange portion 134 includes an edge surface 139 of the second cover part 44 which extends between the inner and outer side surfaces 126 and 128.

A pair of circular fastener openings 136 are formed in the flange portion 134. The fastener openings 136 are spaced apart from each other and are located near to the axial ends of the flange portion 134. A pair of access slots 138 extend between the fastener openings 136 and the edge surface 130. The access slots 138 are tangential to the fastener openings 136.

The flange portion 134 of the second cover part 44 has a flared cross-sectional configuration as best seen in FIG. 2. Specifically, the flange portion 134 is wider (has a greater material thickness) at the edge surface 139 than at the locations of the fastener openings 136.

An outer edge portion 114 (FIG. 5) of the second cover part 44 extends parallel to the axis 36 at a location spaced apart from the inner edge portion 112. The outer edge portion 114 has opposite inner and outer side surfaces 144 and 146 and an edge surface 148 that extends between the side surfaces. The outer edge portion 114 of the second cover part 44 is adjacent to and connected with the rupturable portion 46 of the cover 40, as described below.

The first end wall 116 of the second cover part 44 has a generally planar configuration and extends perpendicular to the axis 36. The first end wall 116 has opposite inner and outer side surfaces 152 and 154 and an edge surface 156 that extends between the side surfaces.

The second end wall 118 of the second cover part 44 has a generally planar configuration and extends perpendicular to the axis 36. The second end wall 118 has opposite inner and outer side surfaces 162 and 164 and an edge surface 166 that extends between the side surfaces. A generally semi-circular opening 168 is formed in the second end wall 118 to enable access to the inflator assembly 32 when the air bag module 10 is in the assembled condition. The opening 168 is centered on the axis 36 when the air bag module 10 is in the assembled condition shown in FIG. 2.

Figure 3:
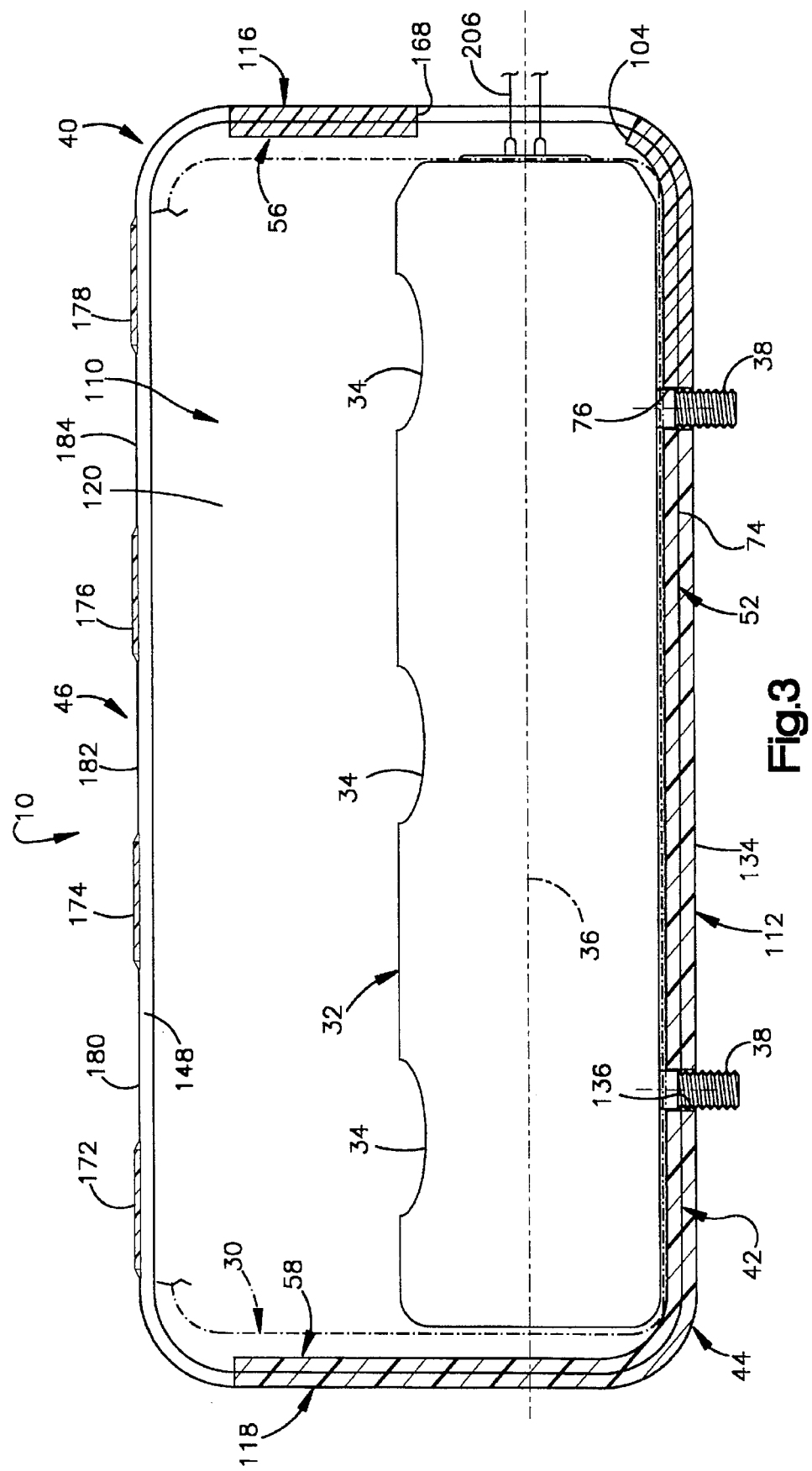
FIG. 3 is a longitudinal sectional view through the air bag module of FIG. 1.

The distance between the first and second end walls 116 and 118 of the second cover part 44 is greater than the distance between the first and second end walls 56 and 58 of the first cover part 42. Accordingly, when the cover 40 is in the closed condition, as illustrated in FIG. 3, the first end wall 116 of the second cover part 44 is spaced axially outward from and partially overlies the first end wall 56 of the first cover part 42. The second end wall 118 of the second cover part 44 is spaced axially outward from and partially overlies the second end wall 58 of the first cover part 42.

The rupturable portion 46 of the cover 40 releasably connects the first and second parts 42 and 44 of the cover. The rupturable portion 46 of the cover 40 comprises a linear series of connector sections 172, 174, 176 and 178 separated by a series of elongate slots 180, 182 and 184. The connector sections 172–178 extend between and interconnect the outer edge portions 54 and 114 of the first and second cover parts 42 and 44, respectively. The material thickness of the connector sections 172–178 is, preferably, substantially less than the material thickness of the adjacent outer edge portions 54 and 114 of the first and second cover parts 42 and 44. For example, the outer edge portions 54 and 114 of the cover parts 42 and 44 may have a material thickness of about two millimeters, while the connector sections 172–178 may have a material thickness of about 0.55 millimeters. The number, length, and spacing of the connector sections 172–178 and of the slots 180–184 may be varied to control the amount of force needed to rupture the rupturable portion 46 of the cover 40.

The rupturable portion 46 of the cover 40 forms a stress riser in the cover. Specifically, the rupturable portion 46 of the cover 40 is a predetermined weakened portion of the cover which is rupturable under less force than is needed to rupture other, surrounding, portions of the cover. This area of predetermined weakness, or stress riser, in the cover 40 results from the fact that the material of the connector sections 172–178 is thinner than the adjacent material of the cover parts 42 and 44, and from the presence of the slots 180–184. As a result, upon inflation of the air bag 30 as described below, the cover 40 opens, in a predetermined manner, at the rupturable portion 46 rather than at any other location.

Figure 4:
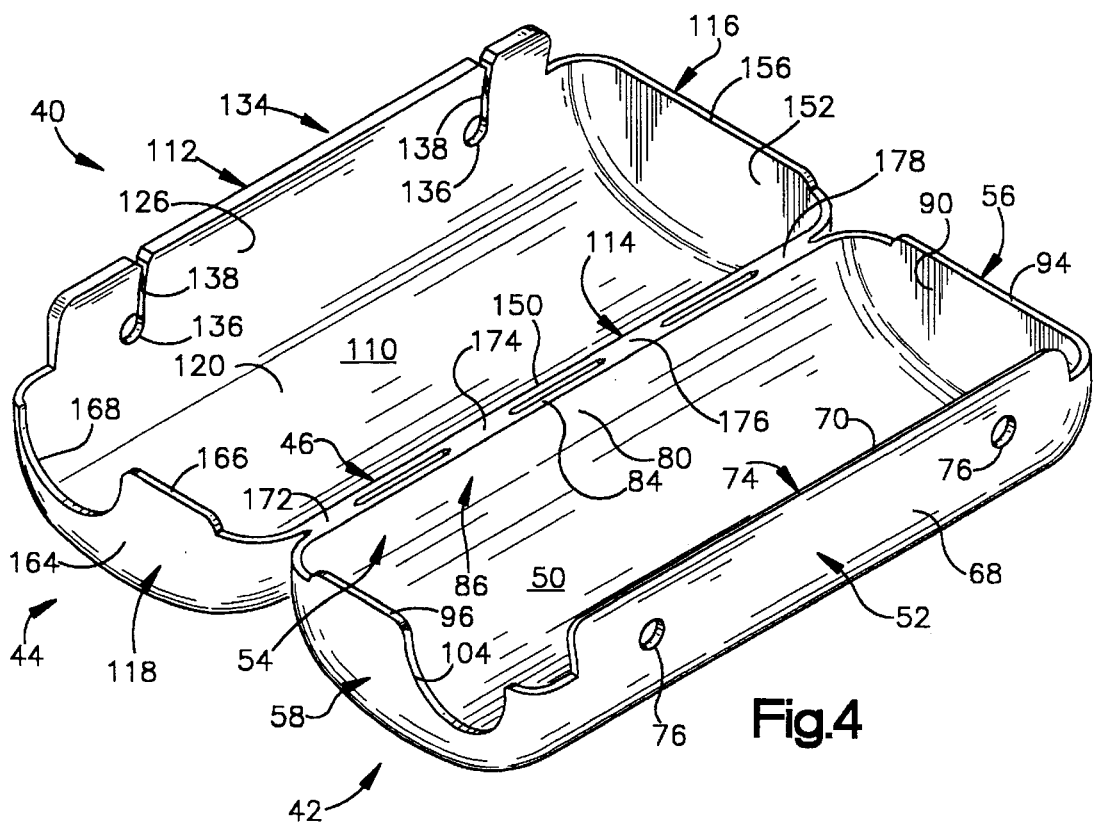
FIG. 4 is a perspective view of the cover of FIG. 2.

The rupturable portion 46 of the cover 40 also forms a hinge or flexible joint between the first and second cover parts 42 and 44. The connector sections 172–178 of the rupturable portion 46 of the cover 40 are substantially more flexible than the outer edge portions 54 and 114 of the cover parts 42 and 44. The cover parts 42 and 44 are pivotable, relative to each other, about the flexible joint or rupturable portion 46 between a first condition as shown in FIGS. 4 and 5 and a second or closed condition as shown in FIGS. 2 and 3. The cover parts 42 and 44 are pivotable relative to each other, about the rupturable portion 46 of the cover, through a range of about 180° between the first condition shown in FIGS. 4 and 5 and the closed condition shown in FIGS. 2 and 3. As the cover parts 42 and 44 move relative to each other, the material of the flexible joint or rupturable portion 46 deforms or flexes.

In assembly of the air bag module 10, the inflator assembly 32 is inserted into the air bag 30. The mounting bolts 38 project through openings in the air bag 30. The air bag 30 is folded in a known manner (not shown) so as to fit within the cover 40 when the cover is in the closed condition.

The cover 40 is then moved from the first condition shown in FIGS. 4–6 to the second or closed condition shown in FIGS. 2 and 3, to enclose the inflator assembly 32 and the air bag 30. During movement of the cover 40 from the first condition to the closed condition, the first and second cover parts 42 and 44 pivot relative to each other about the rupturable portion or flexible joint 46 of the cover. The first and second cover parts 42 and 44 move toward each other through respective arcuate paths 190 and 192 (FIG. 6) which are centered on the rupturable portion 46 of the cover.

During closing of the cover 40, the mounting bolts 38 are first inserted through the fastener openings 76,in the first part 42 of the cover. The second cover part 44 is then moved relative to the mounting bolts 38 so that the mounting bolts move along and through the access slots 138 in the second cover part 44 and into the fastener openings 136.

When the cover 40 is in the closed condition shown in FIGS. 2 and 3, the flange portion 134 of the second part 44 of the cover overlies the flange portion 74 of on the first part 42 of the cover. Lead wires 206 (FIG. 3) on the inflator assembly 32 extend out of the air bag 30 through another opening (not shown) in the air bag. The lead wires 206 are accessible through the openings 104 and 168 in the second end walls 56 and 116, respectively, of the cover 40.

A mounting bracket 200 (FIG. 2) having fastener openings 202 is placed over the mounting bolts 38. A plurality of nuts (not shown) are screwed onto the mounting bolts 38 to secure the mounting bracket 200 on the bolts. The mounting bracket 200 clamps the cover 40 against the air bag 30 and clamps the air bag against the inflator assembly 32. The flange portion 134 of the second cover part 44 is clamped between the mounting bracket 200 and the inner edge portion 52 of the first cover part 42. The flared cross-sectional configuration of the flange portion 134 of the second cover part 44 acts to resist pull-out movement of the flange portion 134 (in a direction to the left as viewed in FIG. 2) upon actuation of the inflator assembly 32. The clamping effect of the mounting bracket 200, together with the presence of the mounting bolts 38 in the fastener openings 76 and 136, effectively interconnects the inner edge portion 52 of the first cover part 42 and the inner edge portion 112 of the second cover part 44 by preventing the edge portions 52 and 112 from moving relative to each other in a left-right direction as viewed in FIG. 2.

The assembled air bag module 10 is secured in the vehicle seat 14 by rigidly affixing the mounting bracket 200 to the seat frame member 12 in the seatback 18. The air bag module 10 is, preferably, mounted on the seatback 18 so that when the seatback is reclined at an angle of 25° from the vertical and the inflator assembly 32 is electrically actuated, the air bag 30 deploys in a generally forward and upward direction as illustrated in FIG. 1. The air bag module 10 when mounted in the seat 14 is enclosed by the seat covering material of the seat and, possibly, by foam cushion material of the seatback 18.

The vehicle in which the air bag module 10 is mounted includes known means indicated schematically at 208 (FIG. 1) for sensing a side impact to the vehicle and for actuating the inflator assembly 32 in response to the sensing of a side impact. The means 208 may include a side impact sensor and vehicle circuitry for electrically actuating the inflator assembly 32 in response to sensing a side impact to the vehicle greater than a predetermined threshold value. The means is electrically connected with the inflator assembly 32, via the lead wires 206, for providing an actuation signal to the inflator assembly.

In the event of a side impact to the vehicle of a magnitude greater than the predetermined threshold value, the inflator assembly 32 is actuated by the means 208. Inflation fluid flows out of the inflator assembly 32 through the fluid outlets 34 and into the air bag 30. The rapidly flowing inflation fluid causes the air bag 30 to inflate in an upward direction as viewed in FIGS. 2 and 7.

The force of the inflating air bag 30 is applied against the inside of the cover 40. Specifically, the inflating air bag contacts the inner side surface 60 of the main wall 50 and the inner side surface 80 of the outer edge portion 54 of the first cover part 42. The inflating air bag 30 also contacts the inner side surface 120 of the main wall 110 and the inner side surface 144 of the outer edge portion 114 of the second cover part 44.

The force of the inflating air bag 30 attempts to open the cover 40 to allow the air bag to inflate out of the cover. The cover 40 opens at the rupturable portion 46, which is the predetermined weakened portion of the cover. The connector sections 172–178 of the rupturable portion 46 break. The outer edge portions 54 and 114 of the first and second cover parts 42 and 44 move away from each other as shown schematically in FIG. 7. The mounting bracket 200 and the inflator assembly 32 cooperate to clamp together or interconnect the inner edge portions 52 and 112 of the first and second cover parts 42 and 44. The interconnected inner edge portions 54 and 114 act as a second hinge, spaced apart from the first hinge 46, about which the first and second cover parts 42 and 44 move away from each other into the open condition shown in FIG. 7.

The first and second cover parts 42 and 44 move away from each other by pivoting along second paths, indicated schematically by the arrows 210 and 212, respectively, in FIG. 7. The second paths 210 and 212 are different from the first paths 190 and 192 (FIG. 6). The cover 40 opens sufficiently that the air bag 30 inflates, between the spaced apart outer edge portions 54 and 114 of the first and second cover parts 42 and 44, into a position as shown schematically in FIG. 1, to help protect the vehicle occupant.

FIG. 8 illustrates a portion of a cover 40a which is constructed in accordance with a second embodiment of the present invention. The cover 40a forms a portion of an air bag module 10a. The cover 40a is generally similar to the cover 40. Similar reference numerals, with the suffix "a" added for clarity, are used to designate parts of the cover 40a which are similar to corresponding parts of the cover 40.

The cover 40a includes access slots 138a which extend radially outward from the centers of fastener openings 136a. The access slots 138a are linear. When the cover 40a is assembled in the air bag module 10a, the mounting bolts (not shown) are moved through and along the linear access slots 138a and into the fastener openings 136a.

FIG. 9 illustrates a portion of a cover 40b which is constructed in accordance with a third embodiment of the present invention. The cover 40b forms a portion of an air bag module 10b. The cover 40b is generally similar to the cover 40. Similar reference numerals, with the suffix "b"added for clarity, are used to designate parts of the cover 40b which are similar to corresponding parts of the cover 40.

The cover 40b includes access slots 138b which extend in arcuate paths from tangential locations on fastener openings 136b. When the cover 40b is assembled in the air bag module 10b, the mounting bolts (not shown) are moved through and along the arcuate access slots 138b and into the fastener openings 136b.

From the above description of the invention, those skilled in the art will perceive improvements, changes and modifications in the invention. For example, the inflator may be mounted partially or completely outside the cover, with the diffuser being mounted inside the cover. Such improvements, changes and modifications within the skill of the art are intended to be covered by the appended claims.

Having described the invention, we claim:

1. A vehicle safety apparatus for helping to protect an occupant of a vehicle seat in the event of an impact to the vehicle, said apparatus comprising:

an inflatable vehicle occupant protection device having a deflated condition and being inflatable into a position adjacent to the vehicle occupant;

an inflator actuatable to provide inflation fluid for inflating said inflatable device from the deflated condition to an inflated condition; and a cover including first and second cover parts which are releasably interconnected by a rupturable portion of said cover;

said cover having a closed condition in which said first and second cover parts enclose said inflatable device when said inflatable device is in the deflated condition;

said rupturable portion of said cover forming a first hinge about which said cover parts are pivotable relative to each other into the closed condition to enclose said inflatable device;

said cover being movable, due to the force of inflation of said inflatable device, from the closed condition to an open condition in which said rupturable portion of said cover is ruptured and said first and second cover parts are spaced apart from each other to enable inflation of said inflatable device out of said cover.

2. An apparatus as set forth in claim 1 wherein said rupturable portion of said cover comprises a stress riser which is formed in said cover and which is rupturable upon application of a predetermined amount of force to said cover.

3. An apparatus as set forth in claim 1 wherein said first and second cover parts have respective outer edge portions releasably interconnected by said rupturable portion of said cover and have respective inner edge portions which are spaced apart in opposite directions along said cover from said rupturable portion of said cover;

said vehicle safety apparatus further including means for interconnecting said inner edge portions of said cover parts when said cover is in the closed condition and during movement of said cover from the closed condition to the open condition, said inner edge portions of said cover when interconnected forming a second hinge which supports said first and second cover parts for pivoting movement from the closed condition to the open condition, said second hinge being spaced apart from said first hinge.

4. An apparatus as set forth in claim 1 wherein said first and second cover parts are pivotable relative to each other about said first hinge through a range of about 180° during movement of said cover into the closed condition.

5. A vehicle safety apparatus for helping to protect an occupant of a vehicle seat in the event of an impact to the vehicle, said apparatus comprising:

an inflatable vehicle occupant protection device having a deflated condition and being inflatable into a position adjacent to the vehicle occupant;

an inflator actuatable to provide inflation fluid for inflating said inflatable device from the deflated condition to an inflated condition;

a cover including first and second cover parts which are releasably interconnected by a rupturable portion of said cover; and means for mounting said inflatable device and said inflator and said cover within the vehicle seat;

said cover having a closed condition in which said first and second cover parts enclose said inflatable device when said inflatable device is in the deflated condition;

said rupturable portion of said cover forming a first hinge about which said cover parts are pivotable relative to each other into the closed position to enclose said inflatable device;

said cover being movable, due to the force of inflation of said inflatable device, from the closed condition to an open condition in which said rupturable portion of said cover is ruptured and said first and second cover parts are spaced apart from each other to enable inflation of said inflatable device out of said cover.

6. An apparatus as set forth in claim 5 wherein said rupturable portion of said cover comprises a stress riser which is formed in said cover and which is rupturable upon application of a predetermined amount of force to said cover.

7. An apparatus as set forth in claim 5 wherein said rupturable portion of said cover comprises an alternating series of connector sections and openings.

8. An apparatus as set forth in claim 5 wherein said cover is formed as one piece including said first part and said second part and said rupturable portion.

9. An apparatus as set forth in claim wherein said first and second cover parts have respective outer edge portions releasably interconnected by said rupturable portion of said cover and have respective inner edge portions which are spaced apart in opposite directions along said cover from said rupturable portion of said cover;

said vehicle safety apparatus further including means for interconnecting said inner edge portions of said cover parts when said cover is in the closed condition and during movement of said cover from the closed condition to the open condition, said inner edge portions of said cover when interconnected forming a second hinge which supports said first and second cover parts for pivoting movement from the closed condition to the open condition, said second hinge being spaced apart from said first hinge.

10. An apparatus as set forth in claim 5 wherein said first and second cover parts have respective outer edge portions releasably interconnected by said rupturable portion of said cover and have respective inner edge portions which are spaced apart in opposite directions along said cover from said rupturable portion of said cover, said rupturable portion of said cover being substantially more flexible than said outer edge portions of said first and second cover parts.

11. An apparatus as set forth in claim 10 wherein said rupturable portion of said cover has a material thickness which is substantially less than the material thickness of said outer edge portions of said first and second cover parts.

12. An apparatus as set forth in claim 5 wherein said first and second cover parts are pivotable relative to each other about said first hinge through a range of about 180° during movement of said cover into the closed condition.

13. A vehicle safety apparatus for helping to protect an occupant of a vehicle seat in the event of an impact to the vehicle, said apparatus comprising:

an inflatable vehicle occupant protection device having a deflated condition and being inflatable into a position adjacent to the vehicle occupant;

an inflator actuatable to provide inflation fluid for inflating said inflatable device from the deflated condition to an inflated condition;

a cover enclosing said inflatable device when said inflatable device is in the deflated condition; and means for mounting said inflatable device and said inflator and said cover within the vehicle seat;

said cover including first and second cover parts and a flexible joint interconnecting said first and second cover parts;

said cover having a first condition in which said first and second cover parts are interconnected by said flexible joint and are spaced apart from each other;

said cover being movable from the first condition to a closed condition in which said cover encloses said inflatable device, said flexible joint supporting said first and second cover parts for relative pivotal movement toward each other along respective first paths during movement of said cover from the first condition to the closed condition;

said cover being movable, due to the force of inflation of said inflatable device, from the closed condition to an open condition in which said flexible joint is ruptured and said first and second cover parts are spaced apart from each other to enable inflation of said inflatable device out of said cover;

said cover having interconnected portions spaced apart from said flexible joint and supporting said first and second cover parts for relative pivotal movement away from each other along second paths different from said first paths during movement of said cover from the closed condition to the open condition.

14. An apparatus as set forth in claim 13 wherein said means for mounting comprises a mounting member which is fixed in position relative to said cover when said cover is in the closed condition and which is rigidly connected with the vehicle seat when said inflatable device and said inflator and said cover are mounted in the vehicle seat, said interconnected portions of said cover being disposed adjacent to said mounting member.

15. An apparatus as set forth in claim 14 wherein said second paths have arcuate configurations centered on said interconnected portions of said cover.

16. An apparatus as set forth in claim 15 wherein said first paths have arcuate configurations centered on said flexible joint.

17. An apparatus as set forth in claim 14 wherein each one of said first and second cover parts has a respective outer edge portion and has a respective inner edge portion spaced apart from said outer edge portion;

said flexible joint extending between and interconnecting said outer edge portions of said first and second cover parts;

said inner edge portions of said cover being spaced apart from each other when said cover is in the first condition, said interconnected portions of said cover comprising said inner edge portions of said first and second cover parts;

said inner edge portions of said cover supporting said first and second cover parts for relative pivotal movement away from each other along said second paths during movement of said cover from the closed condition to the open condition.

18. An apparatus as set forth in claim 14 wherein said flexible joint of said cover comprises a stress riser which is formed in said cover and which is rupturable upon application of a predetermined amount of force to said cover.

19. An apparatus as set forth in claim 14 wherein said cover is formed as one piece including said first part and said second part and said rupturable portion.

\* \* \* \* \*